United States Patent
Nakano

(10) Patent No.: US 7,305,974 B2
(45) Date of Patent: Dec. 11, 2007

(54) ACTIVATED CARBON AND EVAPORATIVE FUEL TREATMENT APPARATUS USING THE ACTIVATED CARBON

(75) Inventor: Masaru Nakano, Saitama (JP)

(73) Assignee: Mahle Filter Systems Japan Corporation, Tokyo (JP)

( * ) Notice: Subject to any disclaimer, the term of this patent is extended or adjusted under 35 U.S.C. 154(b) by 0 days.

(21) Appl. No.: 11/472,390

(22) Filed: Jun. 22, 2006

(65) Prior Publication Data

US 2006/0288872 A1 Dec. 28, 2006

(30) Foreign Application Priority Data

Jun. 23, 2005 (JP) ............... 2005-182740

(51) Int. Cl.
*F02M 33/02* (2006.01)
*F02M 33/04* (2006.01)

(52) U.S. Cl. ...................... 123/519; 123/516

(58) Field of Classification Search ............... 123/519, 123/520, 518, 516; 96/121, 108
See application file for complete search history.

(56) References Cited

U.S. PATENT DOCUMENTS

| | | | | |
|---|---|---|---|---|
| 5,170,765 A | * | 12/1992 | Hoshino et al. | 123/520 |
| 5,564,398 A | * | 10/1996 | Maeda et al. | 123/520 |
| 5,634,450 A | * | 6/1997 | Hara et al. | 123/519 |
| 6,701,902 B2 | * | 3/2004 | Koyama et al. | 123/519 |
| 7,008,470 B2 | * | 3/2006 | Makino et al. | 96/131 |
| 7,021,296 B2 | * | 4/2006 | Reddy | 123/520 |
| 7,059,306 B2 | * | 6/2006 | Reddy | 123/518 |
| 2003/0005912 A1 | * | 1/2003 | Koyama et al. | 123/520 |
| 2004/0206240 A1 | * | 10/2004 | Oh et al. | 96/135 |
| 2005/0022796 A1 | * | 2/2005 | Zuchara | 123/519 |

FOREIGN PATENT DOCUMENTS

JP 2002-256989 A 9/2002

* cited by examiner

*Primary Examiner*—Mahmoud Gimie
(74) *Attorney, Agent, or Firm*—Foley & Lardner LLP

(57) ABSTRACT

An activated carbon adsorbing and desorbing evaporative fuel has pores formed therein with the following rates: a rate of a pore whose pore diameter is smaller than or equal to 20 Å in which butane is apt to remain with respect to a pore whose pore diameter is smaller than or equal to 100 Å is less than or equal to 20%, and a rate of a pore whose pore diameter is greater than 20 Å and smaller than or equal to 25 Å that is effective in adsorbing low boiling point gas components with respect to the pore whose pore diameter is smaller than or equal to 100 Å is between 15 and 25%. An evaporative fuel treatment apparatus has a filling chamber filled with the activated carbon as an adsorbent.

3 Claims, 4 Drawing Sheets

PRIOR ART

ACTIVATED CARBON AND EVAPORATIVE FUEL TREATMENT APPARATUS USING THE ACTIVATED CARBON

BACKGROUND OF THE INVENTION

The present invention relates to an activated carbon and an evaporative fuel treatment apparatus using the activated carbon.

In a vehicle using gasoline as fuel, a canister (a carbon or charcoal canister) is normally used as the evaporative fuel treatment apparatus, in order to prevent evaporated fuel in a fuel tank from discharging into the atmosphere. The canister performs the function of adsorbing and desorbing the evaporated fuel as follows: The evaporated fuel generated from the fuel tank in an engine halt state is adsorbed by an adsorbent which is made of the activated carbon. After that, by negative pressure, generated by an intake of the engine, through the canister at engine start-up, an inside of the canister is purged with atmospheric air introduced from an air port. That is, the adsorbed evaporated fuel is desorbed from the adsorbent, and burnt in the engine. The adsorbent, therefore, regains its adsorbing capability by the purge, and thus being able to adsorb the evaporated fuel repeatedly and well.

Recently, in this kind of canister, an activated carbon having high adsorbing capability has tended to be used as the adsorbent, with miniaturization of the canister due to small layout of the vehicle, and also for request for increase in the adsorbing capability due to upsizing of the fuel tank. However, in a case where the activated carbon having high adsorbing capability is used as the adsorbent that fills the canister, once the evaporated fuel is adsorbed, it is difficult to desorb the adsorbed evaporated fuel from the adsorbent. That is, desorption efficiency is reduced, and there is a possibility that the inside of the canister may not be fully purged, even though the purge is done during travel. As a result, the so-called "blow-by phenomenon" might occur in which the adsorbed evaporated fuel, that remains in the canister without being purged, diffuses toward an adsorbent layer arranged at a side of the atmosphere in the canister, and the adsorbent can not fully adsorb the subsequent incoming evaporated fuel from the fuel tank, and the evaporated fuel without being adsorbed discharges into the atmosphere through the air port.

For the above problem, a canister has been disclosed in Japanese Patent Provisional Publication No. 2002-256989 (hereinafter is referred to as "JP2002-256989"). In JP2002-256989, the canister has three different types of activated carbons A, B, and C shown in FIG. 4, and therefore the canister prevents the blow-by phenomenon.

As seen in FIG. 4, the activated carbon A has characteristics that a peak is positioned at a pore diameter of the activated carbon, whose diameter satisfies an adsorption/desorption balance of vapor of gasoline, and curves on both sides of the peak gather around this pore diameter. The peak value of the pore diameter is substantially 2.5 nm, and an area (pore volume) formed by the curve of the activated carbon A and a horizontal axis is larger than that of the activated carbon B (described next). Here, the smaller the pore diameter, the greater the strength of adsorption (adsorbing force or power, or, holding force or power) tends to be. In addition, the area and an amount of adsorption are substantially proportional. Thus, the activated carbon A has characteristics that the holding power of the evaporated fuel is relatively weak, and the adsorption amount of the evaporated fuel is large.

As for the activated carbon B, the peak position is the same as that of the activated carbon A, but the pore volume is smaller than that of the activated carbon A. Thus, the activated carbon B has characteristics that the holding power of the evaporated fuel is relatively weak in the same manner as the activated carbon A, and the adsorption amount of the evaporated fuel is smaller than that of the activated carbon A.

As for the activated carbon C, the peak is positioned at a pore diameter of the activated carbon, whose diameter is suitable for the adsorption of low boiling point components (mainly, butane) in gasoline vapor, and curves on both sides of the peak gather around this pore diameter. Further, the peak position is around 2 nm, and the pore volume is small as compared with the activated carbons A, B. Thus, the activated carbon C has characteristics that the adsorption amount of the evaporated fuel is smaller than those of the activated carbons A, B, but the holding power of the evaporated fuel is relatively strong as compared with the activated carbons A, B.

In the canister of JP2002-256989, an adsorbent layer formed of the activated carbon A is arranged at a side of a charge port (tank port) and a side of a purge port, both of which are positioned at one end of an evaporative fuel passage formed in the canister. Further, an adsorbent layer formed of the activated carbon B, or two adsorbent layers: the adsorbent layer formed of the activated carbon B and an adsorbent layer formed of the activated carbon C, are arranged at a side of an air port which is positioned at another end of the evaporative fuel passage. The canister, therefore, prevents generation of the blow-by phenomenon.

SUMMARY OF THE INVENTION

In the above canister of JP2002-256989, two or three different adsorbent layers, each of which is formed of the respective activated carbons A, B or C, are disposed separately or individually in the canister as described above. With respect to the adsorbent layers, in the case where the adsorbent layer arranged at the side of the air port is filled with the activated carbon B whose adsorbing capability is small, since a holding amount of the evaporated fuel during the adsorption is reduced, a remaining amount of the evaporated fuel after the purge can be relatively decreased at the side of the air port. In this case, however, there is a problem that the adsorbing capability of the canister as a whole is relatively reduced. In addition to this, in the case where the adsorbent layer arranged at the side of the air port is filled with the activated carbon C whose adsorbing force is strong especially for the low boiling point components, a remaining gas (evaporated fuel) that remains in the adsorbent layer arranged at the side of the air port is relatively increased after the purge. As a result, there is a possibility that an incoming blow-by gas from the charge port will not be completely trapped. Furthermore, the remaining gas itself at the side of air port might discharge into the atmosphere through the air port.

It is therefore an object of the present invention to provide an activated carbon and an evaporative fuel treatment apparatus using the activated carbon, which have an adequate adsorbing capability of the evaporated fuel and are capable of preventing the discharge of the evaporated fuel into the atmosphere.

According to one aspect of the present invention, an activated carbon adsorbs and desorbs evaporative fuel; said activated carbon has pores formed therein, a rate of a pore whose pore diameter is smaller than or equal to 20 Å in which butane is apt to remain with respect to a pore whose pore diameter is smaller than or equal to 100 Å is less than or equal to 20%, and a rate of a pore whose pore diameter is greater than 20 Å and smaller than or equal to 25 Å that is effective in adsorbing low boiling point gas components with respect to the pore whose pore diameter is smaller than or equal to 100 Å is between 15 and 25%.

According to another aspect of the present invention, an activated carbon adsorbs and desorbs evaporative fuel; said activated carbon has pores formed therein, whose maximum pore diameter among them is substantially 100 Å, a rate of a pore whose pore diameter is smaller than or equal to 20 Å in which butane is apt to remain with respect to a pore whose pore diameter is smaller than or equal to 100 Å is less than or equal to 20%, and a rate of a pore whose pore diameter is greater than 20 Å and smaller than or equal to 25 Å that is effective in adsorbing low boiling point gas components with respect to the pore whose pore diameter is smaller than or equal to 100 Å is between 15 and 25%.

According to a further aspect of the present invention, an evaporative fuel treatment apparatus comprises a casing in which a flow passage of an evaporative fuel is formed, having at one end side of the flow passage a charge port adapted to be connected to a fuel tank, a purge port adapted to be connected to an inlet side of an engine, and at another end side of the flow passage an air port communicated with the atmosphere; a filling chamber provided inside the casing, through which the evaporative fuel flows as the flow passage; an adsorbent that fills the filling chamber, and adsorbs and desorbs evaporative fuel; and the filling chamber is filled with an activated carbon having pores that are formed with the following rates: a rate of a pore whose pore diameter is smaller than or equal to 20 Å in which butane is apt to remain with respect to a pore whose pore diameter is smaller than or equal to 100 Å is less than or equal to 20%, and a rate of a pore whose pore diameter is greater than 20 Å and smaller than or equal to 25 Å that is effective in adsorbing low boiling point gas components with respect to the pore whose pore diameter is smaller than or equal to 100 Å is between 15 and 25%, as the adsorbent.

According to a still further aspect of the present invention, an evaporative fuel treatment apparatus comprises a casing in which a flow passage of an evaporative fuel is formed, having at one end side of the flow passage a charge port adapted to be connected to a fuel tank, a purge port adapted to be connected to an inlet side of an engine, and at another end side of the flow passage an air port communicated with the atmosphere; a filling chamber provided inside the casing, through which the evaporative fuel flows as the flow passage; an adsorbent that fills the filling chamber, and adsorbs and desorbs evaporative fuel; and the filling chamber is filled with an activated carbon having pores whose maximum pore diameter among them is substantially 100 Å and that are formed with the following rates: a rate of a pore whose pore diameter is smaller than or equal to 20 Å in which butane is apt to remain with respect to a pore whose pore diameter is smaller than or equal to 100 Å is less than or equal to 20%, and a rate of a pore whose pore diameter is greater than 20 Å and smaller than or equal to 25 Å that is effective in adsorbing low boiling point gas components with respect to the pore whose pore diameter is smaller than or equal to 100 Å is between 15 and 25%, as the adsorbent.

The other objects and features of this invention will become understood from the following description with reference to the accompanying drawings.

DETAILED DESCRIPTION OF THE INVENTION

Figure 1:
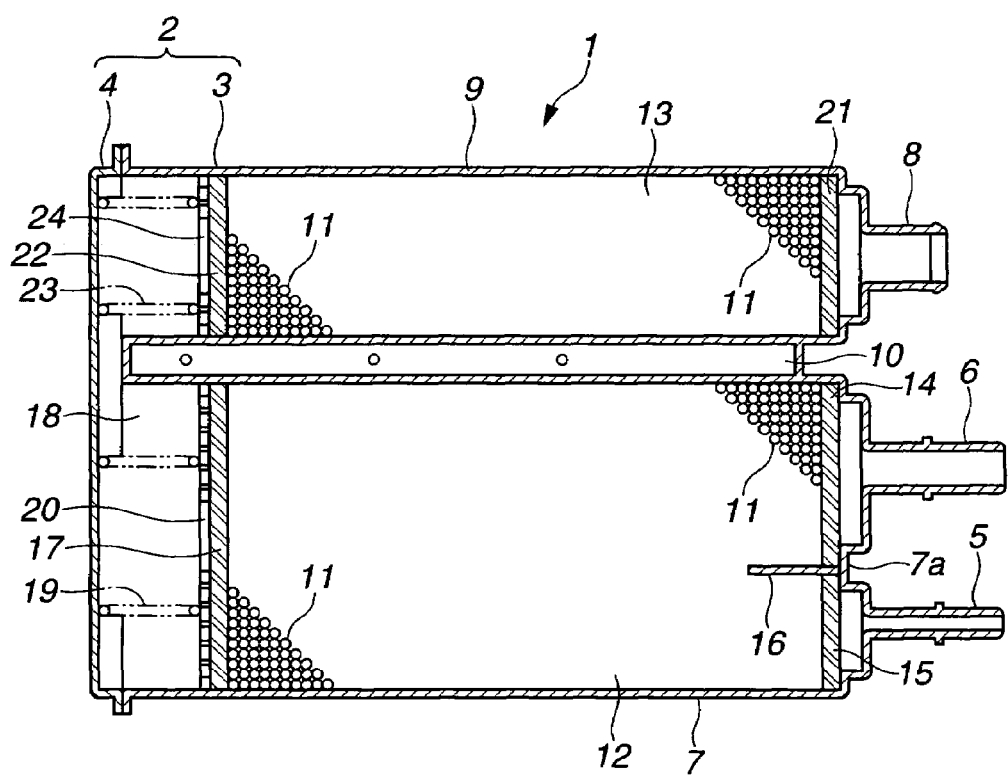
FIG. 1 is an explanation drawing showing the whole evaporative fuel treatment apparatus (canister) according to a first embodiment of the present invention.

A first embodiment of the present invention will be explained below with reference to the drawings. FIG. 1 shows an evaporative fuel treatment apparatus 1 (hereinafter, called a canister 1). In the following description, in FIG. 1 (also FIG. 3), a right hand side of canister 1 is termed "one end (side)", and a left hand side is termed "the other end (side)", for explanation, and these are not to be construed as limiting terms.

A casing 2 of canister 1 is made of synthetic resin, and is formed of a main case 3 and a cap 4. Cap 4 closes an opening of the other end of main case 3 formed longitudinally. Main case 3 has a first cylindrical portion 7 and a second cylindrical portion 9, both of which are formed longitudinally and substantially cylindrical in shape. At one side of first cylindrical portion 7, a purge port 5 connected to an inlet or intake system (or inlet or intake side) of an engine (not shown), and a charge port 6 connected to a fuel tank (not shown) are provided adjacently to each other. At one side of second cylindrical portion 9, an air port 8 (or an atmosphere port 8) communicated with the atmosphere is provided. Both the other ends of first and second cylindrical portions 7, 9 are opened, and closed by cap 4.

These first cylindrical portion 7 and second cylindrical portion 9 are disposed so that they are adjacent to each other. And further, they are connected to each other by a stiffening rib 10. Then, shape of main case 3 is substantially rectangular parallelepiped like a box.

In first and second cylindrical portions 7, 9, a first filling chamber 12 and a second filling chamber 13 are respectively formed longitudinally. Further, both of the first and second filling chambers 12, 13 are filled with an activated carbon or charcoal 11 as an adsorbent that adsorbs and desorbs evaporated fuel (or evaporative fuel). (Regarding activated carbon 11, it will be described later in detail.)

First filling chamber 12 is communicated with charge port 6 via a first porous screen member 14, and also communicated with purge port 5 via a second porous screen member 15, at one side of first filling chamber 12. First and second screen member 14, 15 are partitioned by a partition wall 16 that projects or protrudes from one side wall surface 7a of first cylindrical portion 7 toward the other side (left hand side in FIG. 1) of first cylindrical portion 7 in first filling chamber 12.

On the other hand, at the other side of first filling chamber 12, first filling chamber 12 is communicated with a communication passage 18 defined by the other end portion (left side portion in FIG. 1) of main case 3 and cap 4, via a third porous screen member 17. Third screen member 17 is urged toward one side (right hand side in FIG. 1) of first filling chamber 12 by a first perforated plate or panel 20 which receives spring force of a first spring 19.

As for second filling chamber 13, second filling chamber 13 is communicated with air port 8 via a fourth porous screen member 21 at one side (right hand side in FIG. 1) of second filling chamber 13. While, second filling chamber 13 is communicated with communication passage 18 via a fifth porous screen member 22 at the other side (left side portion in FIG. 1) of second filling chamber 13. Fifth screen member 22 is urged toward one side of second filling chamber 13 by a second perforated plate or panel 24 which receives spring force of a second spring 23.

First and second filling chambers 12, 13 are communicated with each other via communication passage 18 at the other sides of first and second filling chambers 12, 13. First and second filling chambers 12, 13 and communication passage 18, therefore, form a flow passage whose shape is a U-shaped structure inside casing 2 and in which a purge air and the evaporated fuel etc. turn at communication passage 18.

Regarding the filling chambers and the flow passage, in the embodiment, a plurality of the filling chambers are provided or arranged, and the flow passage is formed. However, these are not limited to this. That is, at least one filling chamber can be provided in the canister, and the charge port and the purge port are formed at one end side of the filling chamber, and the air port is formed at another end side of the filling chamber. Then, the purge air and the evaporated fuel etc. flow through the filling chamber, the flow passage is, therefore, formed or defined.

With respect to screen members 14, 15, 17, 21, 22, each of them is made of urethane or nonwoven fabric, and has the function of preventing activated carbon 11 from falling out, and holding or retaining activated carbon 11.

Figure 2:
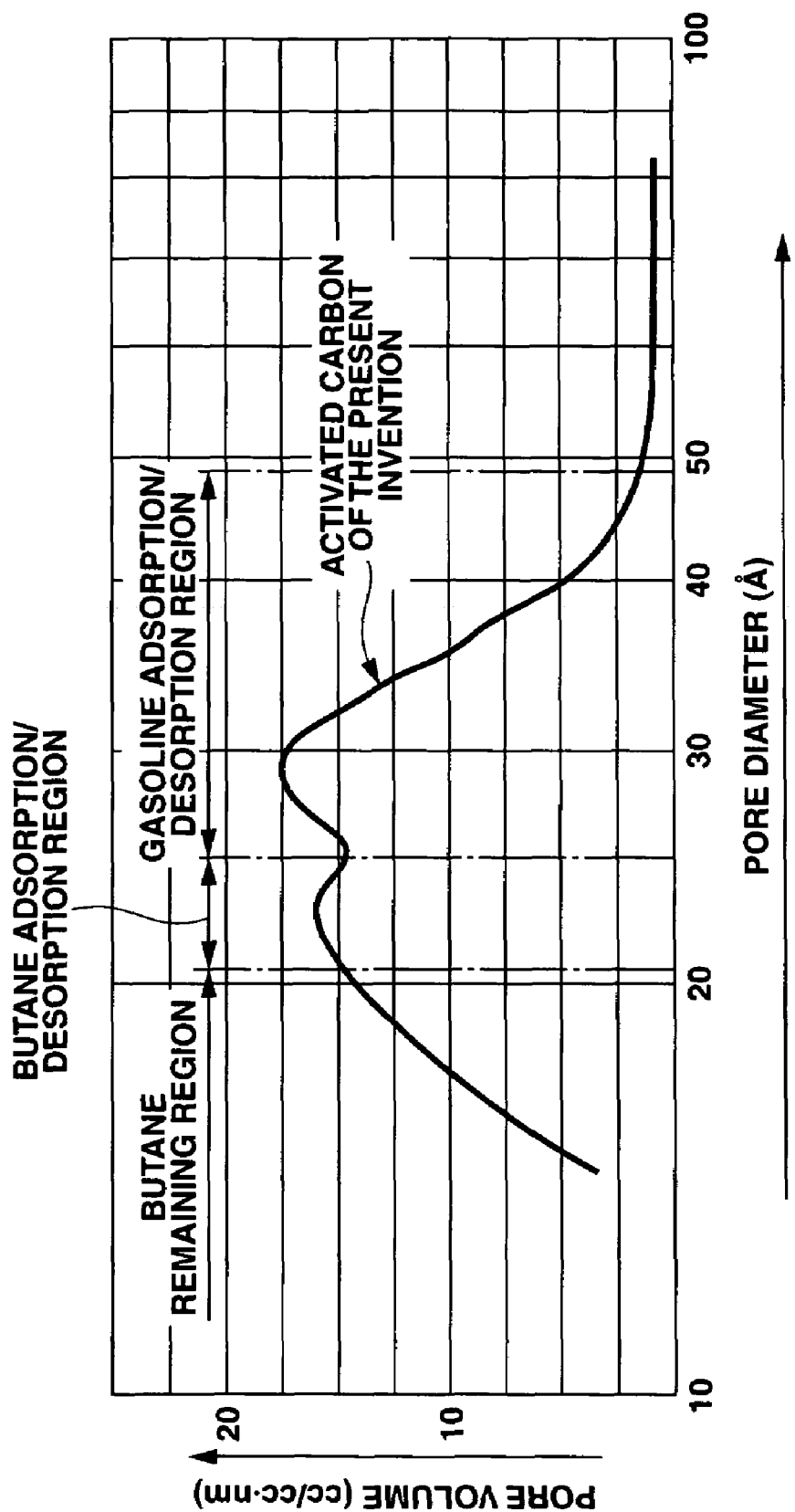
FIG. 2 is an explanation drawing showing pore distribution of activated carbons.

FIG. 2 shows a pore distribution of activated carbon 11 which fills first and second filling chambers 12, 13. This pore distribution is a measurement result obtained by the so-called nitrogen (N2) adsorption method. And in FIG. 2, the following pore volume is defined by an area formed by the curve of the pore distribution and a horizontal axis.

As can be seen in FIG. 2, activated carbon 11 is formed such that activated carbon 11 has two maximum values of pore diameter in the pore distribution, one of which is between 20 and 25 Å, another of which is in a region of 25 Å or greater, and pore volume whose pore diameter is between 25 and 50 Å that is effective in adsorbing gasoline vapor (here, this pore is called "pore A") is large, and pore volume whose pore diameter is between 20 and 25 Å that is effective in adsorbing low boiling point gas components such as butane (here, this pore is called "pore B") is less than that of pore A, and pore volume whose pore diameter is smaller than or equal to 20 Å in which the butane is apt to remain (here, this pore is called "pore C") is small. With respect to the volume of the pore B, it is less than the volume of the pore A. However, activated carbon 11 is formed so that the volume of pore B becomes a volume appropriate to predetermined request for the adsorption.

As for the form of activated carbon 11, in more detail, activated carbon 11 is formed such that a rate of the pore C whose pore diameter is smaller than or equal to 20 Å in which the butane is apt to remain with respect to a pore whose pore diameter is smaller than or equal to 100 Å is less than or equal to 20%, and a rate of the pore B whose pore diameter is greater than 20 Å and smaller than or equal to 25 Å that is effective in adsorbing low boiling point gas components with respect to the pore whose pore diameter is smaller than or equal to 100 Å is between 15 and 25%. With 100 Å, it is the substantially maximum pore diameter among the pores in the activated carbon.

With respect to size of the pore diameter, the smaller the pore diameter, the greater the holding force or power that holds or retains an adsorbed evaporated fuel in the pore, conversely, the greater the pore diameter, the smaller the holding force of the adsorbed evaporated fuel.

As explained above, in canister 1 of the first embodiment, activated carbon 11 in which the pores A, B, C reside together with the above-mentioned rate is used as the adsorption, in contrast with the adsorbent layers in the canister of JP2002-256989, each of which is formed of the respective activated carbons A, B, C, and the each is arranged separately or individually. Canister 1 using activated carbon 11 as the adsorbent, therefore, has high adsorbing capability for components whose boiling point is higher than or equal to that of the low- boiling point components (i.e. components in a gasoline adsorption/desorption region in FIG. 2), and also has adsorbing capability appropriate to request for the adsorption of the low boiling point components such as the butane (i.e. components in a butane adsorption/desorption region in FIG. 2). In addition, since pore volume in a butane remaining region (pore diameter is smaller than or equal to 20 Å) is small, canister 1 can reduces or lowers a level of the remains of the butane. That is to say, it is possible to ensure the capability for adsorbing not only the low boiling point components in the butane adsorption/desorption region in the evaporated fuel but also the components in the gasoline adsorption/desorption region, whose boiling point is higher than or equal to that of the low boiling point components, in the evaporated fuel. Furthermore, because of the small pore volume in the butane remaining region, a remaining amount or a residual amount of the butane after purge can be relatively reduced, and thereby effectively preventing the blow-by phenomenon.

Figure 3:
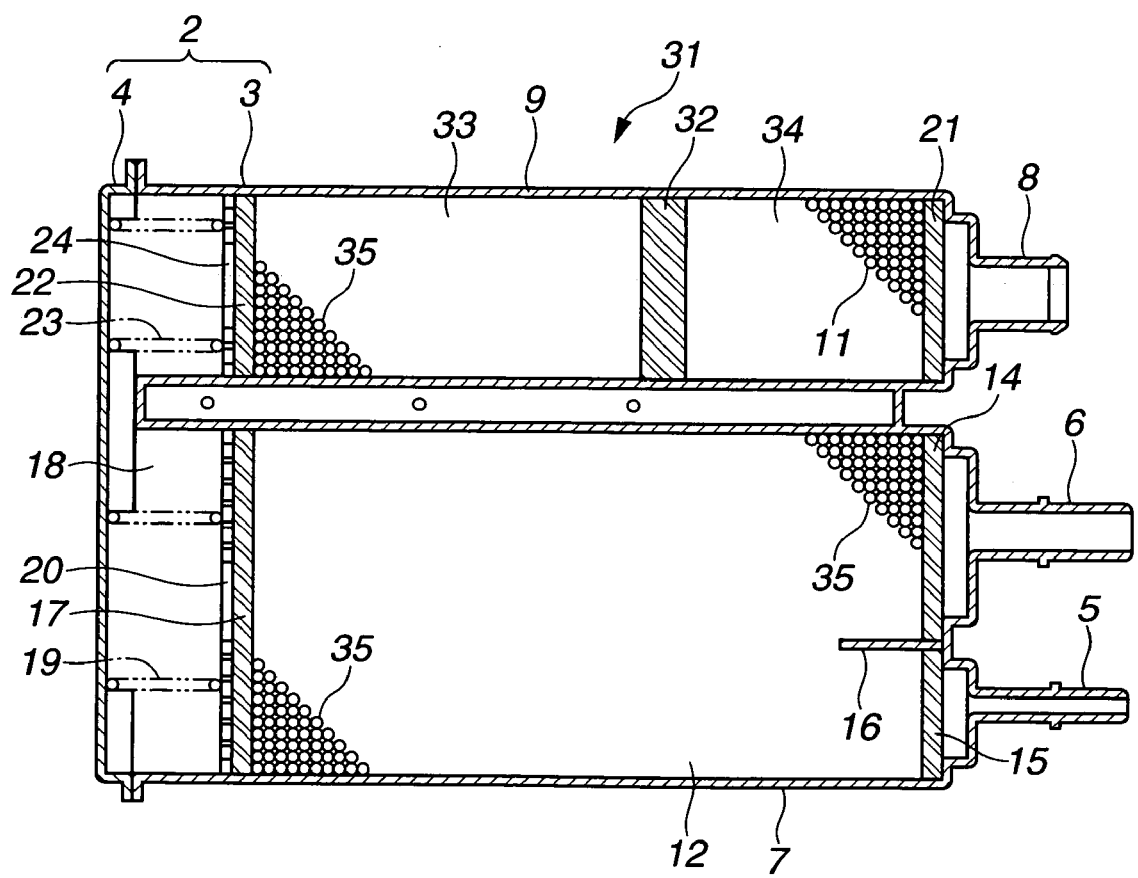
FIG. 3 is an explanation drawing showing the whole evaporative fuel treatment apparatus (canister) according to a second embodiment of the present invention.
Figure 4:
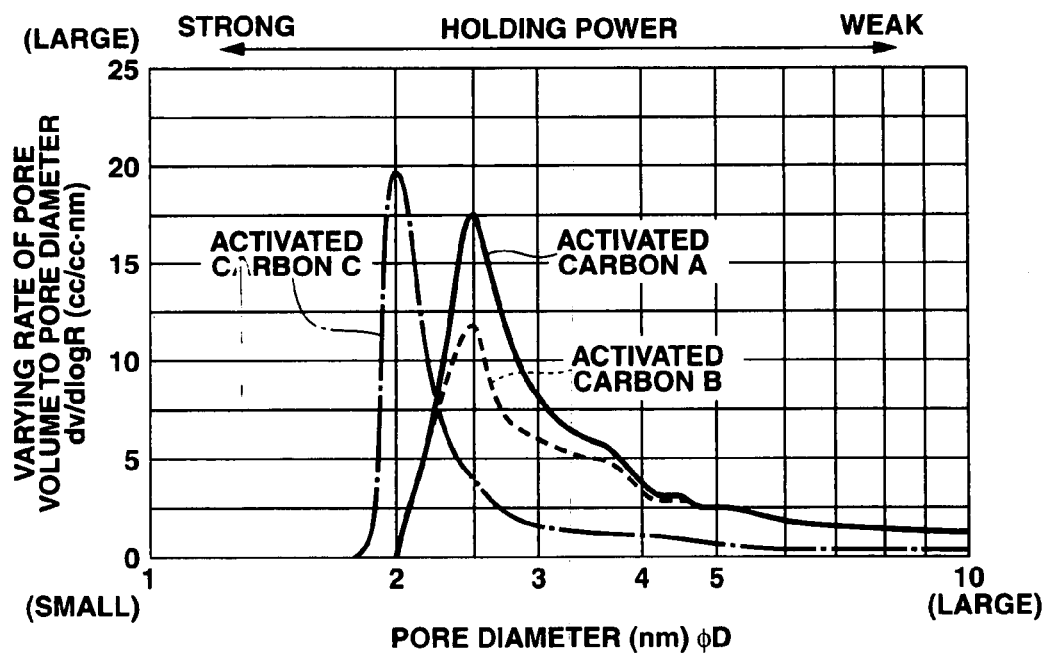
FIG. 4 is an explanation drawing showing a relation between a pore diameter of the activated carbon and a varying rate of a pore volume with respect to the pore diameter in a related art.

Next, a canister 31 of a second embodiment will be explained with reference to FIG. 3. Canister 31 is structurally similar to canister 1 of the first embodiment, except for the inside of second cylindrical portion 9 and the activated carbon. More specifically, a sixth porous screen member 32 is provided inside second cylindrical portion 9, and divides the inside of second cylindrical portion 9 into two chambers. Then, a second filling chamber 33 at the side of communication passage 18 and a third filling chamber 34 at the side of air port 8 are defined by sixth screen member 32. As for the activated carbon, first filling chamber 12 formed inside first cylindrical portion 7 and second filling chamber 33 formed inside second cylindrical portion 9 are filled with an activated carbon 35 having high adsorbing capability. While, third filling chamber 34 located at the side of air port 8 is filled with the above-mentioned activated carbon 11 having the pore distribution shown in FIG. 2. Here, activated carbon 35 having high adsorbing capability is, for instance, the activated carbon A in FIG. 4 etc. That is, volume of the pore A whose pore diameter is between 25 and 50 Å that is effective in adsorbing gasoline vapor is large. In other words, the activated carbon is the one that contains a high proportion of the pore A (or volume of the pore A).

As described above, first filling chamber 12 and second filling chamber 33, which are formed at the side of charge port 6, are filled with activated carbon 35 whose adsorbing capability is high. On the other hand, only third filling chamber 34 located at the side of air port 8 is filled with the activated carbon 11. It is therefore possible to effectively prevent the discharge or escape of the evaporative fuel into the atmosphere, caused by the blow-by phenomenon, in the same manner as the canister of the first embodiment. In addition, by activated carbon 35 that fills filling chambers formed at the side of charge port 6, the gasoline vapor from the fuel tank is intensively adsorbed or trapped.

In the shown embodiment, only third filling chamber 34 located at the side of air port 8 is filled with the activated carbon 11. However, it is not limited to this. That is, some of the filling chambers may be filled with the activated carbon 11. However, at least the filling chamber located at the side of air port must be filled with the activated carbon 11.

This application is based on a prior Japanese Patent Application No. 2005-182740 filed on Jun. 23, 2005. The entire contents of this Japanese Patent Application No. 2005-182740 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An activated carbon adsorbing and desorbing evaporative fuel; said activated carbon having pores formed therein, whose maximum pore diameter among them is substantially 100 Å, a pore distribution of the pores being such that a percentage of pores whose pore diameter is smaller than or equal to 20 Å in which butane is apt to remain constitutes less than or equal to 20% of the pores whose pore diameter is smaller than or equal to 100 Å and a percentage of the pores whose pore diameter is greater than 20 Å and smaller than or equal to 25 Å which is effective in adsorbing low boiling point gas components constitutes 15 to 25% of the pores whose pore diameter is smaller than or equal to 100 Å.

2. An evaporative fuel treatment apparatus comprising:
a casing in which a flow passage of an evaporative fuel is formed, having at one end side of the flow passage a charge port adapted to be connected to a fuel tank, a purge port adapted to be connected to an inlet side of an engine, and at another end side of the flow passage an air port communicated with the atmosphere;
a filling chamber provided inside the casing, through which the evaporative fuel flows as the flow passage;
an adsorbent that fills the filling chamber, and adsorbs and desorbs evaporative fuel; and
the filling chamber being filled with an activated carbon having pores whose maximum pore diameter among them is substantially 100 Å and that are formed such that a pore distribution of the pores is such that a percentage of pores whose pore diameter is smaller than or equal to 20 Å in which butane is apt to remain constitutes less than or equal to 20% of the pores whose pore diameter is smaller than or equal to 100 Å and a percentage of the pores whose pore diameter is greater than 20 Å and smaller than or equal to 25 Å which is effective in adsorbing low boiling point gas components constitutes 15% to 25% of the pores whose pore diameter is smaller than or equal to 100 Å, as the adsorbent.

3. The evaporative fuel treatment apparatus as claimed in claim 2, comprising:
a plurality of the filling chambers disposed inside the casing, through which the evaporative fuel flows as the flow passage, and wherein:
at least one of the filling chambers which is located at a side of the air port is filled with the activated carbon as the adsorbent.

* * * * *